US012647469B2

(12) United States Patent
Braganza

(10) Patent No.: US 12,647,469 B2
(45) Date of Patent: Jun. 2, 2026

(54) GENERATIVE AI PLATFORM INTEGRATION WITH VIDEO CONFERENCING

(71) Applicant: Mitel Networks Corporation, Kanata (CA)

(72) Inventor: Jonathan Braganza, Ottawa (CA)

(73) Assignee: MITEL NETWORKS CORPORATION, Kanata (CA)

( * ) Notice: Subject to any disclaimer, the term of this patent is extended or adjusted under 35 U.S.C. 154(b) by 286 days.

(21) Appl. No.: 18/237,293

(22) Filed: Aug. 23, 2023

(65) Prior Publication Data

US 2025/0071072 A1     Feb. 27, 2025

(51) Int. Cl.
| | |
|---|---|
| *H04L 65/403* | (2022.01) |
| *H04L 51/02* | (2022.01) |
| *H04N 7/14* | (2006.01) |
| *H04N 7/15* | (2006.01) |

(52) U.S. Cl.
CPC ............ *H04L 65/403* (2013.01); *H04L 51/02* (2013.01); *H04N 7/147* (2013.01); *H04N 7/15* (2013.01); *H04N 7/157* (2013.01)

(58) Field of Classification Search
None
See application file for complete search history.

(56) References Cited

U.S. PATENT DOCUMENTS

| | | | |
|---|---|---|---|
| 10,540,971 B2 * | 1/2020 | Kumar | H04L 12/1827 |
| 2020/0090649 A1 * | 3/2020 | Pengelley | G10L 15/30 |
| 2021/0359874 A1 | 11/2021 | Zhuk et al. | |
| 2021/0390144 A1 | 12/2021 | B M S et al. | |
| 2022/0256115 A1 * | 8/2022 | Kim | H04L 51/02 |
| 2023/0208869 A1 | 6/2023 | Bisht et al. | |
| 2024/0012550 A1 * | 1/2024 | Lin | G06T 5/70 |

FOREIGN PATENT DOCUMENTS

IN     202311009963 A     5/2023

OTHER PUBLICATIONS

Lisa Metrikin, "How Zoom.ai Uses Conversational AI to Help People Work Better" Apr. 5, 2018, Medium.com.

* cited by examiner

*Primary Examiner* — Quoc D Tran

(57) ABSTRACT

A videoconferencing system that generates at least one participant bot unique to a videoconference participant or topic. The videoconferencing system comprises: a videoconferencing server; a participant bot engine that generates and stores the at least one participant bot is further configured to direct a videoconference invitation from the videoconferencing server to the at least one participant bot. One or more databases are in communication with the participant bot-generation engine, wherein the database stores organizational information and makes the organizational information available to the participant bot. The videoconferencing server is configured to send a videoconference invitation to the bot engine and the bot engine is configured to accept the videoconference invitation and have a participant bot participate in the videoconference.

21 Claims, 3 Drawing Sheets

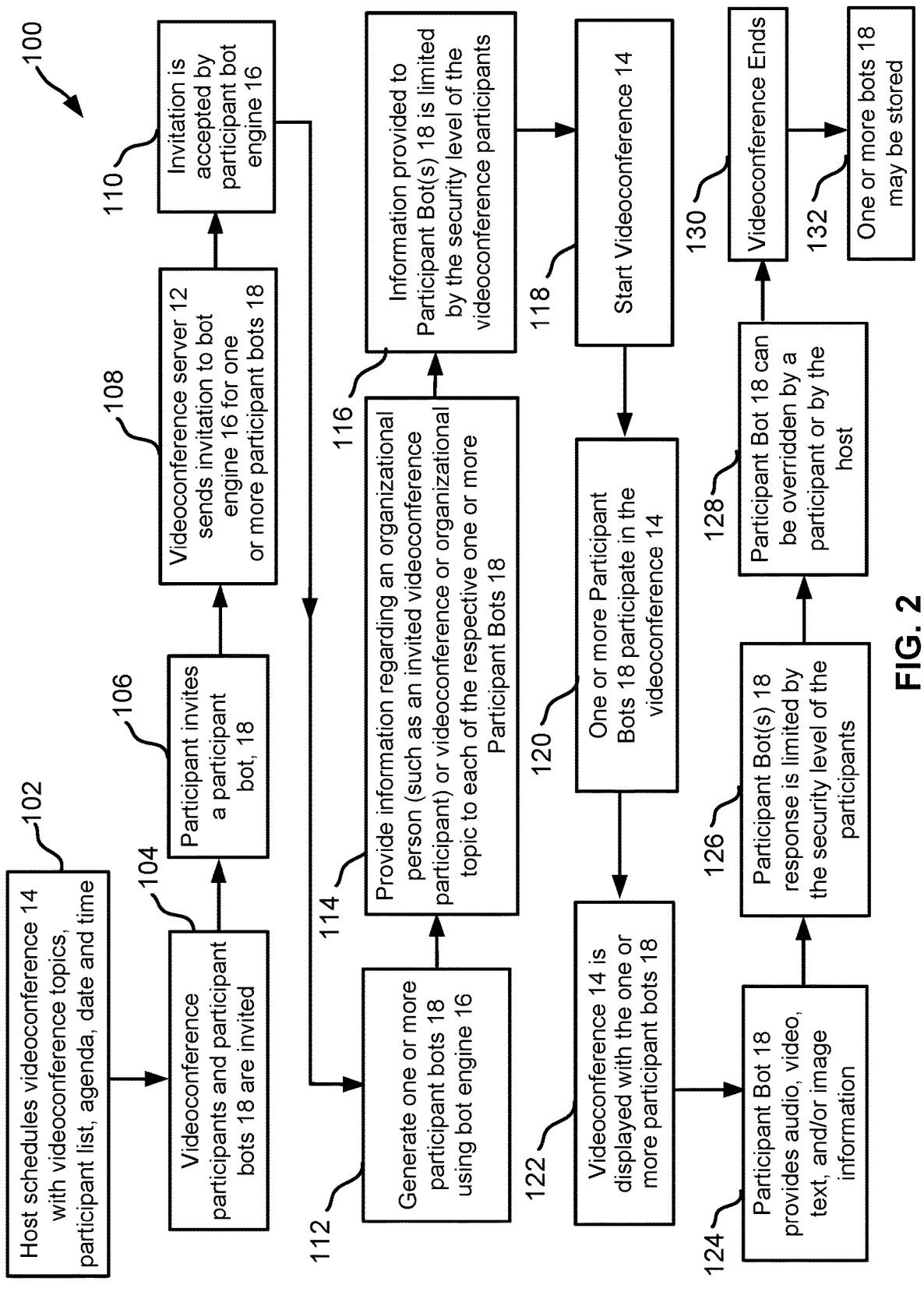

100

102 — Host schedules videoconference 14 with videoconference topics, participant list, agenda, date and time 104 — Videoconference participants and participant bots 18 are invited 106 — Participant invites a participant bot, 18

108 — Videoconference server 12 sends invitation to bot engine 16 for one or more participant bots 18

110 — Invitation is accepted by participant bot engine 16

112 — Generate one or more participant bots 18 using bot engine 16

114 — Provide information regarding an organizational person (such as an invited videoconference participant) or videoconference or organizational topic to each of the respective one or more Participant Bots 18

116 — Information provided to Participant Bot(s) 18 is limited by the security level of the videoconference participants 118 — Start Videoconference 14

120 — One or more Participant Bots 18 participate in the videoconference 14

122 — Videoconference 14 is displayed with the one or more participant bots 18

124 — Participant Bot 18 provides audio, video, text, and/or image information

126 — Participant Bot(s) 18 response is limited by the security level of the participants 128 — Participant Bot 18 can be overridden by a participant or by the host 130 — Videoconference Ends 132 — One or more bots 18 may be stored

FIG. 2

GENERATIVE AI PLATFORM INTEGRATION WITH VIDEO CONFERENCING

BACKGROUND

Video conferencing is a popular method for communicating within a business setting. Many companies rely on videoconferences for staff members to interact with one another. Many regularly-scheduled meetings occur between employees, although videoconferences can still be scheduled on an ad hoc basis.

Videoconferences are an effective tool to bring employees together to virtually meet and discuss business-related items. They are also effective in helping people work together when they are not located in the same area, or unable to meet at the same location.

There have also been advances in generative artificial intelligence (AI) platforms, such as OpenAI's ChatGPT and Google's Bard, which are incorporating natural language processing (NLP) and adaptive learning to interact with humans in a natural setting.

There are also services available today that can summarize a meeting and send out meeting notes, action items, etc.

BRIEF DESCRIPTION OF THE DRAWINGS

The subject matter of the present disclosure is particularly pointed out and distinctly claimed in the concluding portion of this specification. A more complete understanding of the present disclosure, however, may best be obtained by referring to the detailed description and claims when considered in connection with the drawing figures, wherein:

FIG. 2 is an exemplary computer-implemented method according to aspects of this disclosure.

Figure 1:
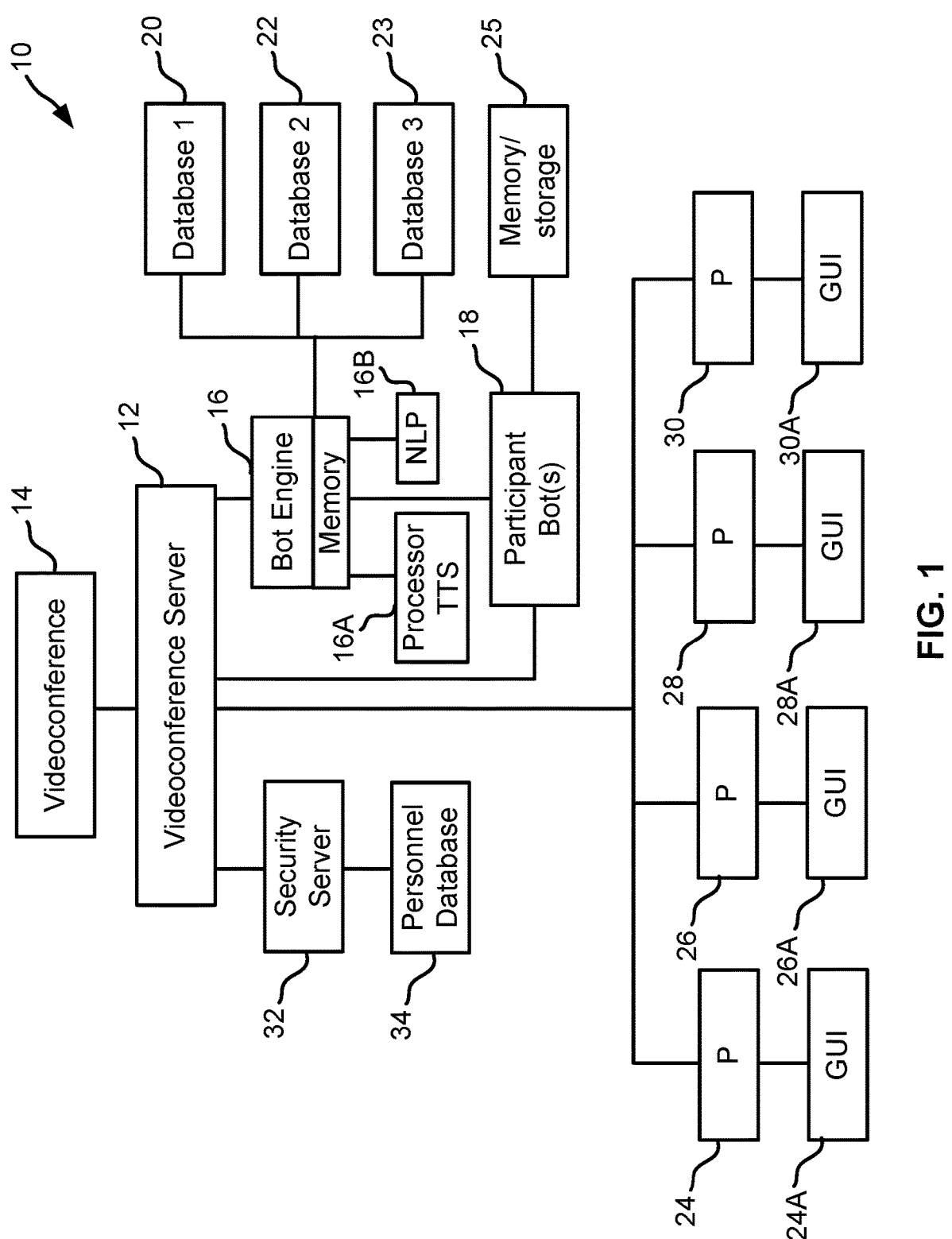
FIG. 1 is an exemplary system according to aspects of this disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

This disclosure proposes forming an entity, which is an artificial intelligence (AI) bot (or simply bot) that can be invited to a videoconference and help fill in informational gaps when there is knowledge missing from the human participants, or when a human participant is unavailable and the bot takes his/her place.

Systems and methods of this disclosure propose creating bots, which can be (1) specialized to have knowledge about different organizational functions, such as sales, marketing, customer service, technical support, information technology (IT), finance, human resources (HR), general information, or other, or (2) specialized to different persons within the organization. Such a bot can be programmed to be an expert on the knowledge of an organizational function or person and can contribute to or lead conferences.

Systems and methods proposed herein use a generative AI bot that uses machine learning to "learn" about certain aspects of a business by being provided the information. A company can create many different bots, and in theory an unlimited number. One or more bots can then be invited to a videoconference by human hosts or participants, and the bot(s) can listen to the videoconference conversation and can be queried to provide information by the host, participants or even another bot. Such bots could be relied upon, for example, to provide information as an expert on a topic of the videoconference.

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus.

As used herein, "engine" refers to a data-processing apparatus, such as a processor, configured to execute computer program instructions, encoded on computer storage medium, wherein the instructions control the operation of the engine. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

This invention proposes creating a virtual bot entity (or "bot" or "AI bot") which can learn different specialized areas of a specific company. This would be using the advances of today's generative AI platforms, such as ChatGPT. When thinking of the current state of these entities, they may be seen as an "all knowing entity" that has obtained information from many different organizational sources, such as organizational computers and servers, the general internet, or news feeds, or other. The difference between this bot and general use bots is that this specific type of bot can create conversational type responses and can compartmentalize different components of a conversation and can recall or build upon this information later in the conversation.

Companies can use this technology to create their own specialized bot entities that can learn different important areas of the business. For instance, a bot can be created for a sales team that is provided specific sales data important to the sales team but can also be used by other teams. This may include things such as sales numbers or top selling products, competitor information, profits, and other information. This information can all be provided to the bot and the bot's learning capabilities can present the information in an appropriate manner. One thing that must be considered is the security level of the information, as some employees may not be privy to some information obtained by the bot.

The bot can be invited to different videoconferences and be used to listen to and provide commentary from the participants when called upon. The bot can be given a name so that when called upon the bot knows it is being spoken to just like any other participant.

For example, "Sales-y" is a sales bot which has been fed information from the sales team with all of their pertinent sales related information. "Sales-y" is invited to the sales team meeting. If one of the attendees requests the "last months' sales numbers", he/she can ask "Sales-y" to provide these numbers. Using the previously obtained data, "Sales-y" can provide the correct response to the conference attendees.

Another consideration is that the bot is also listening to the videoconference and can learn additional information from listening and can be later called upon to recollect facts and/or details that were previously mentioned. The bot will become a subject-matter-expert on the topics that it has learned and will have access to all of the information from the participants.

Turning now to the figures, wherein the purpose is to describe embodiments of this disclosure and not to limit the claims, FIG. 1 shows a system 10 according to this disclosure. A videoconference server 12 is any computer, server, processor or device suitable to perform the functions described herein. Videoconference server 12 is configured to run a videoconference 14 from a file provided directly or indirectly to videoconference server 12, or the file may be loaded into videoconference server 12. A bot engine (also called a bot generation engine) 16 is in communication with videoconference server 12 and is configured to generate a participant bot (or bot) 18 as described herein, wherein the bot is placed in the videoconference 14 by videoconference server 12.

Bot engine 16 is in communication with a first database 20 and a second database 22. First database 20 comprises organizational information organized by organization function, such as information technology (IT), finance, human resources (HR), building maintenance, sales, and marketing. Second database 22 comprises organizational information organized by persons within the organization and preferably has access to each person's emails, calendars, past conference participations, possibly cached phone conversations, internet browsing, and all electronic files pertaining to each person, or at least a plurality of persons, at the organization. Although shown as two separate databases 20, 22, a single database, or more than two databases, may be utilized to provide the organizational information. Further, the databases may be in indirect communication with bot engine 16, such as through videoconference server 12. Preferably the participant bot(s) 18 are in communication with the bot engine 16 and indirectly with databases 20, 22 via bot engine 16 and videoconference server 12 while bot 18 is in a videoconference 14 so each bot 18 in videoconference 14 has access to new or updated organizational information. As used herein with respect to all system 10 devices, "in communication" means in direct or indirect communication.

A third database 23 includes one or more video attributes and voice attributes that can be selected for a participant bot 18. The video attributes and voice attributes may be selected by a videoconference 14 participant, which includes the videoconference 14 host, or may be selected by bot engine 16 based on the nature of the videoconference. The video attributes are how the bot 18 will appear in videoconference 14. The bot 18 could, for example, appear as a robot, an avatar (thus, database 23 may include or have access to an avatar library) or as a man or woman of any age with any skin color, hair color, eye color, and other physical attributes. The bot 18 may appear as an animal or as any organization person, including a participant who could not attend videoconference 14. Bot 18 may also have any suitable voice and may speak in any language. And the participant bot 18 may be assigned a name by a human participant or by bot engine 16. A participant can command a participant bot 18 to participate in the videoconference 14 in place of the participant or in addition to the participant and direct bot engine 16 to create an appropriate bot depending on the participant's needs.

Bot engine 16 commands bot 18 to function in videoconference 14. A text-to-speech (TTS) processor 16A and a natural language processor (NLP) 16B are in communication with bot engine 16. TTS engine 16A can generate speech from text and NLP 16B generates text from speech. TTS engine 16A and NLP 16B may be part of bot engine 16 or separate devices in communication with bot engine 16. Using NLP 16B words spoken by participants can be translated into text for understanding by bot engine 16. Bot engine 16, utilizing TTS 16A, can cause bot 18 to speak answers. A memory/storage 19 is configured to store each participant bot 18 if desired. Then a participant bot 18 can be retrieved by bot engine 16 when requested and be updated with new organizational information from databases 20, 22 if needed for a future videoconference.

Videoconference server 12 is in communication with a plurality of participant devices 24, 26, 28, and 30 although there could be any number of participant devices. Each participant device has a graphical user interface (GUI) 24A, 26A, 28A, and 30A that each participant (also called a user and wherein one or more of the participants is the videoconference host(s)) can utilize to communicate with videoconference server 12. A security server 32 as shown is in direct communication with videoconference server 12 and in indirect communication with bot engine 16. Security server 32 is also in communication with personnel database 34, which includes a confidentiality or security clearance rating for each person in the organization.

When using system 10, a participant first schedules a videoconference by using his/her GUI 24A, 26A, 28A, 30A to contact videoconference server 12 and send a videoconference invitation. The videoconference invitation may include the other videoconference participants, the videoconference title, agenda, and date and time. The participant who schedules the videoconference may be the videoconference host, or another person may be the host, or a bot 18 may be the host.

When sending the videoconference invitation via videoconference server 12, the participant may also invite one or more participant bots 18 with knowledge of an organizational function, or a plurality of organizational functions, or with the knowledge of a person in the organization, or of a plurality of persons in the organization. The videoconference server 12 sends an invitation to bot engine 16, which accepts the invitation and either creates an appropriate participation bot(s) 18 or retrieves a participation bot(s) 18 from memory/storage 19 and updates the retrieved bot(s) 18 with any new information from databases 20, 22, 23. A participant bot 18 could be created when the videoconference 14 is scheduled, and then stored in memory/storage 19, and then be retrieved and updated with additional information when or just before the videoconference 14 starts. Alternatively, bot 18 can be created by bot engine 16 when or just before videoconference 14 starts.

A participant bot 18 can have a visual image and voice selected by a host, a human participant, or by the bot engine 16 from third database 23 based on any criteria, such as the nature of the videoconference or the videoconference 14 participants. The participant bot 18 is configured to answer queries provided to it by text through a participant GUI 24A, 26A, 28A, 30A or by voice by one of the participants. The participant bot 18 remains in communication with bot engine 16, which has, or is in communication with, NLP 16B and TTS engine 16A, as discussed previously.

Security server 32 detects confidential information from (1) the videoconference invitation information, and (2) the information sought to be downloaded for a participation bot 18 from database 20 or 22. Security server 32 is configured to determine the identity of all videoconference participants and query personnel database 34 to determine if any of the participants should not receive any information that may be stored for a participant bot 18. If so, security server 32 takes one of two actions: (1) it instructs bot engine 16 not to download the confidential information into the memory 16C of bot engine 16, because such confidential information is available to participant bot 18, or (2) it instructs bot engine 16 to download the confidential information but not to permit participant bot 18 to provide the confidential information during videoconference 14.

FIG. 2 illustrates a method 100 according to this disclosure. At step 102 a videoconference host (or other participant) sends a videoconference invitation with one or more videoconference topics, a participant list, agenda, and the date and time of the videoconference 14. Any suitable information can be included in the videoconference invitation. At step 104 the videoconference participants and one or more participant bot(s) 18 are invited to the videoconference. Because the participants may be able to invite one or more bots 18, step 104 may be broken into two steps, wherein participants (and possibly one or more bots 18) are first invited at step 104 and at step 106 a participant invites one or more participant bots 18 utilizing a GUI 24A, 26A, 28A, or 30A to communicate with videoconference server 12 to send an invitation to bot engine 16. Bot engine 16 accepts the invitation at step 110.

At step 112, bot engine 16 generates one or more participant bots 18 and based on the bot(s) requested, each bot 18 is provided access at step 114 to information regarding an organizational person(s), an organizational function(s), or a videoconference topic(s). Thus, one bot 18 could be programmed via bot engine 16 to have information about a plurality of organizational persons and/or a plurality of videoconference topics, and/or a plurality of organizational functions. At step 116, the information provided to a bot 18 may be limited by the security level of the information sought versus the security level of the videoconference participants.

The videoconference 14 starts at step 118 and the one or more participant bots 18 participate in videoconference 14 at step 120, in which the videoconference 14 is displayed at step 122. Each bot 18 may provide information in the form of audio, video, text, and images. The information is provided by bot engine 16 communicating with videoconference server 12, which makes the information available to videoconference participants, including other bots 18. Step 126 is used as an alternative to step 116 or in conjunction with step 116. If a bot 18 has access to confidential or secure information that was not blocked or filtered at step 116, at step 126 bot 18 will not provide such information if some participants do not have a sufficient security rating.

At step 128, which can occur at any suitable time(s) during the videoconference 14, bot 18 can be silenced or otherwise overridden by a human participant or another bot 18 with the appropriate authority credentials. At step 130, the videoconference ends. At step 132, any of the one or more bot(s) 18 may be stored in storage/memory 19.

Figure 3:
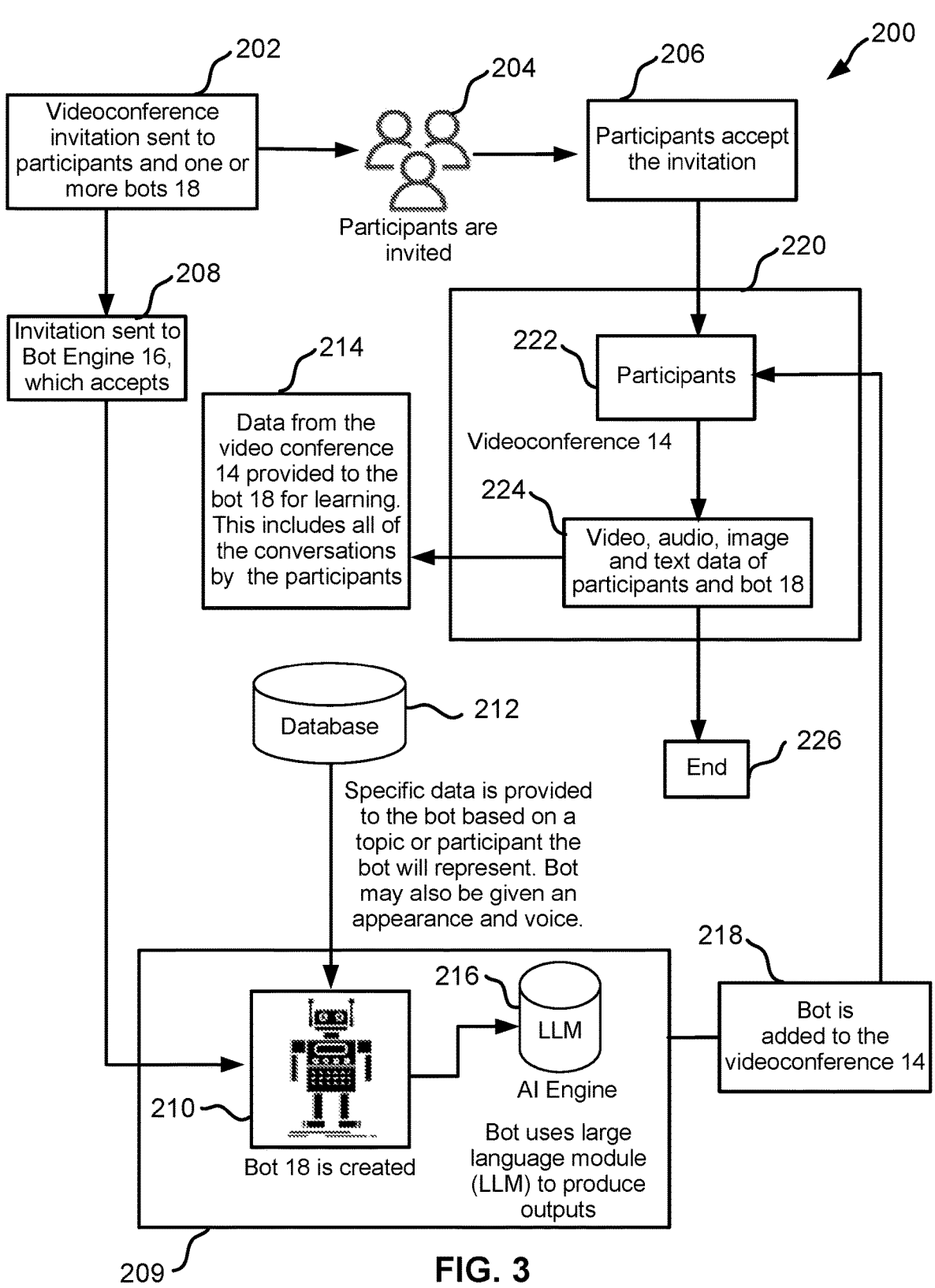
FIG. 3 is an alternate computer-implemented method according to aspects of this disclosure.

FIG. 3 shows an alternate system 200 according to this disclosure. At step 202, a videoconference invitation is sent to participants including to one or more bots 18. The human participants receive the invitation at step 204 and accept it at step 206. The invitation to one or more bots 18 is sent to bot engine 16 at step 208, which accepts the invitation. At step 209, bot engine 16 configures a bot 18 for the videoconference 14. The bot 18 is created at step 210 and provided with specific data at step 212 from one or more databases, such as databases 20, 22, 23. The databases are updated and at step 214 data from each videoconference in which bot 18 participates is added to the data made available to bot 18. A large language module (LLM) is provided at step 216 to permit bot 18 to produce outputs.

At step 218, bot 18 is added to the videoconference 14, which commences at step 220. The bot 18 joins the other videoconference participants at step 222, and the participants and bot 18 can provide video, audio, image, and text data in the videoconference 14 at step 224. The videoconference 14 ends at step 226.

The description of embodiments provided herein is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features. The methods and systems according to this disclosure and claims can operate in a premise, cloud-based, or hybrid environment.

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A videoconferencing system that generates at least one participant bot unique to a videoconference participant or a videoconference topic, wherein the videoconferencing system comprises:

a videoconferencing server;

a participant bot-generation engine in communication with the videoconferencing server, wherein the participant bot-generation engine generates and stores the at least one participant bot unique to the videoconference participant, or the videoconference topic and wherein the participant bot-generation engine is further configured to direct a videoconference invitation from the videoconferencing server to the at least one participant bot;

a database in communication with the participant bot-generation engine, wherein the database stores organizational information of the videoconference participant or the videoconference topic and makes the organizational information available to the participant bot; and a display in communication with the videoconferencing server, the display configured to display a videoconference and display the participant bot present in the videoconference;

wherein the videoconferencing server is configured to send the videoconference invitation via the participant bot-generation engine to the at least one participant bot and the at least one participant bot is configured to accept the videoconference invitation and participate in the videoconference, wherein any videoconference participant in the videoconference can query the at least one participant bot with a question and receive a response from the at least one participant bot based on the organizational information.

2. The videoconferencing system of claim 1, wherein the participant bot-generation engine generates and stores a plurality of participant bots and each of the plurality of participant bots is unique to one of a plurality of videoconference participants or to one of a videoconference topic.

3. The videoconferencing system of claim 2, wherein the database stores organizational information related to each of the plurality of videoconference participants or to each of the videoconference topics and makes the information for a unique videoconference participant or a unique videoconference topic available to the participant bot associated with the unique videoconference participant.

4. The videoconferencing system of claim 1, wherein the organizational information includes information from videoconferences in which the at least one participant bot or the videoconference participant participates.

5. The videoconferencing system of claim 1, wherein the organizational information includes video information, text information, and audio information.

6. The videoconferencing system of claim 5, wherein the at least one participant bot is in communication with the videoconferencing server and is configured to cause, when directed, the videoconferencing server to play audio information or video information that is part of the organizational information provided to the participant bot.

7. The videoconferencing system of claim 1, wherein the videoconference participant has a participant device that is configured to command the participant bot to attend a videoconference or command the participant bot not to attend the videoconference.

8. The videoconferencing system of claim 1, wherein any videoconference participant in the videoconference can query the at least one participant bot by an audio question or a text question.

9. A videoconferencing method that utilizes at least one participant bot, wherein the videoconferencing method comprises the steps of:

using a participant bot-generation engine, generating and storing at least one participant bot unique to a videoconference participant or a videoconference topic, and directing videoconference invitations from a videoconferencing server to the at least one participant bot;

utilizing a database in communication with the participant bot-generation engine, providing organizational information of the videoconference participant or the videoconference topic to the at least one participant bot;

using the videoconferencing server, sending a videoconference invitation via the participant bot-generation engine to the at least one participant bot;

the at least one participant bot accepting the videoconference invitation and participating in the videoconference, wherein any videoconference participant in the videoconference can query the at least one participant bot with a question and receive a response from the at least one participant bot based on the organizational information; and using a display in communication with the videoconferencing server, displaying the videoconference and the participant bot present in the videoconference.

10. The videoconferencing method of claim 9, wherein the at least one participant bot is configured to communicate during the videoconference by one or more of audio, text, and video.

11. The videoconferencing method of claim 9, wherein the videoconference participant can utilize a participant device or voice command to override the participant bot's response to a query.

12. The videoconferencing method of claim 9, wherein the database provides to the at least one participant bot a security level for the organizational information and a security level for each videoconference participant in the videoconference.

13. The videoconferencing method of claim 12, wherein the participant bot identifies each videoconference participant and determines the security level for each videoconference participant, and the participant bot is configured not to disclose information above the security level of the lowest security level of any of the videoconference participants.

14. The videoconferencing method of claim 9, wherein the at least one participant bot is provided the information for an organizational function.

15. The videoconferencing method of claim 14, wherein the organizational function is one of sales, marketing, information technology (IT), finance, warehousing, and manufacturing.

16. A videoconferencing system that generates at least one participant bot, wherein the videoconferencing system comprises:

a videoconferencing server;

a participant bot-generation engine in communication with the videoconferencing server, wherein the participant bot-generation engine generates and stores at least one participant bot unique to a videoconference participant or a videoconference topic, and wherein the participant bot generation engine is further configured to direct a videoconference invitation from the videoconferencing server to the at least one participant bot;

a database in communication with the participant bot-generation engine, wherein the database stores (a) organizational information of the videoconference participant or the videoconference topic, (b) a security level for the organizational information, and (c) a security level for each organization member, and makes the organizational information, security level for the organizational information, and the security level for each organization member available to the at least one participant bot; and a display in communication with the videoconferencing server, the display configured to display a videoconference and display the participant bot present in the videoconference;

wherein the videoconferencing server is configured to send a videoconference invitation via the participant bot-generation engine to the at least one participant bot and the at least one participant bot is configured to accept the videoconference invitation and participate in the videoconference.

17. The videoconferencing system of claim 16, wherein the database is also in communication with a central organizational database and is configured to access information, such as emails, chats, phone logs, and documents, and the information is provided to the at least one participant bot.

18. The videoconferencing system of claim 16, wherein the security level is based in part on each videoconference participant's job title.

19. The videoconferencing system of claim 16, wherein the organizational information provided to the at least one participant bot is dependent upon the lowest security level of each organization member that will participate in the videoconference.

20. The videoconferencing system of claim 16 that further includes a large language model (LLM) in an artificial intelligence (AI) module to predict new content, wherein the AI module is in communication with the database, the database saves the new content, and the new content is provided to the at least one participant bot.

21. The videoconferencing system of claim 20, wherein the at least one participant bot is further programmed to provide solutions to problems posed during the videoconference by utilizing the new content.

\* \* \* \* \*